Feb. 20, 1968    R. A. LEHMKUHL ET AL    3,369,820
POWER CHUCK

Original Filed Sept. 19, 1962    4 Sheets-Sheet 1

INVENTORS
ROBERT A. LEHMKUHL
ROBERT E. REED
BY
Wolfe, Hubbard, Voit & Osann
ATTYS.

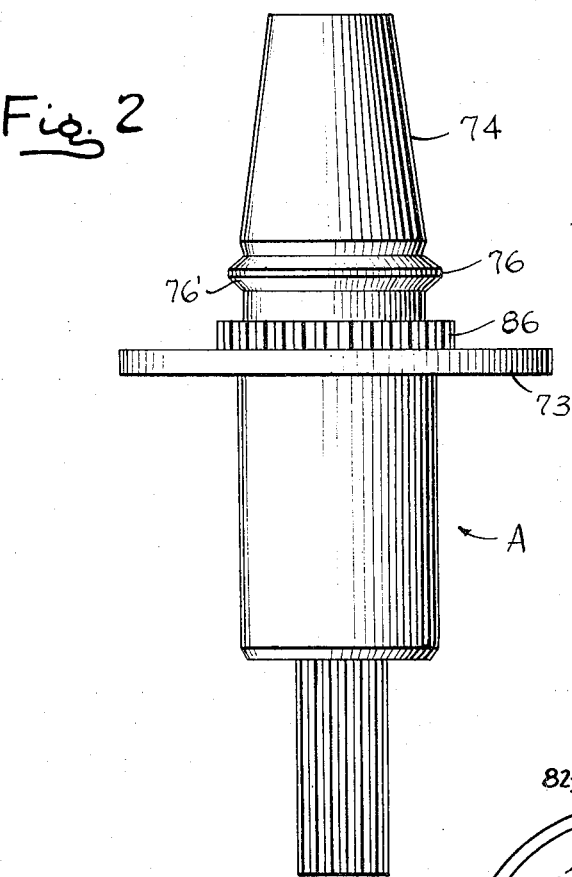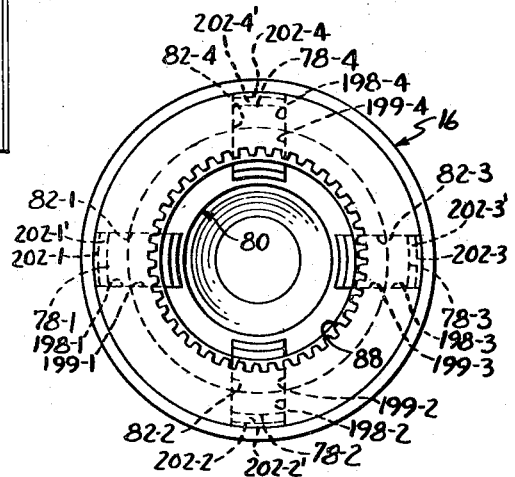

Feb. 20, 1968   R. A. LEHMKUHL ET AL   3,369,820
POWER CHUCK
Original Filed Sept. 19, 1962   4 Sheets-Sheet 3
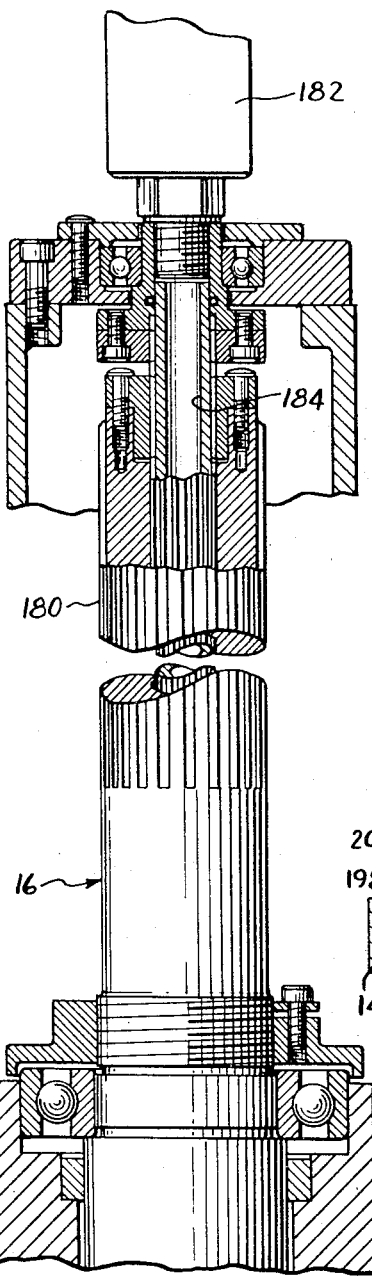
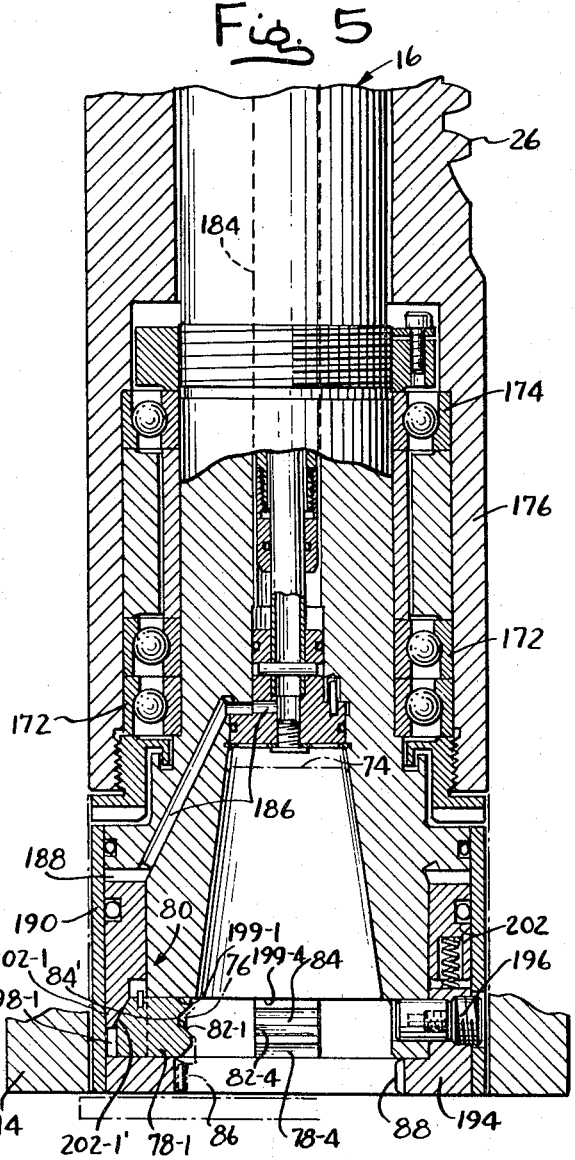
INVENTORS
ROBERT A. LEHMKUHL
ROBERT E. REED
BY
Wolfe, Hubbard, Voit & Osann
ATTYS.

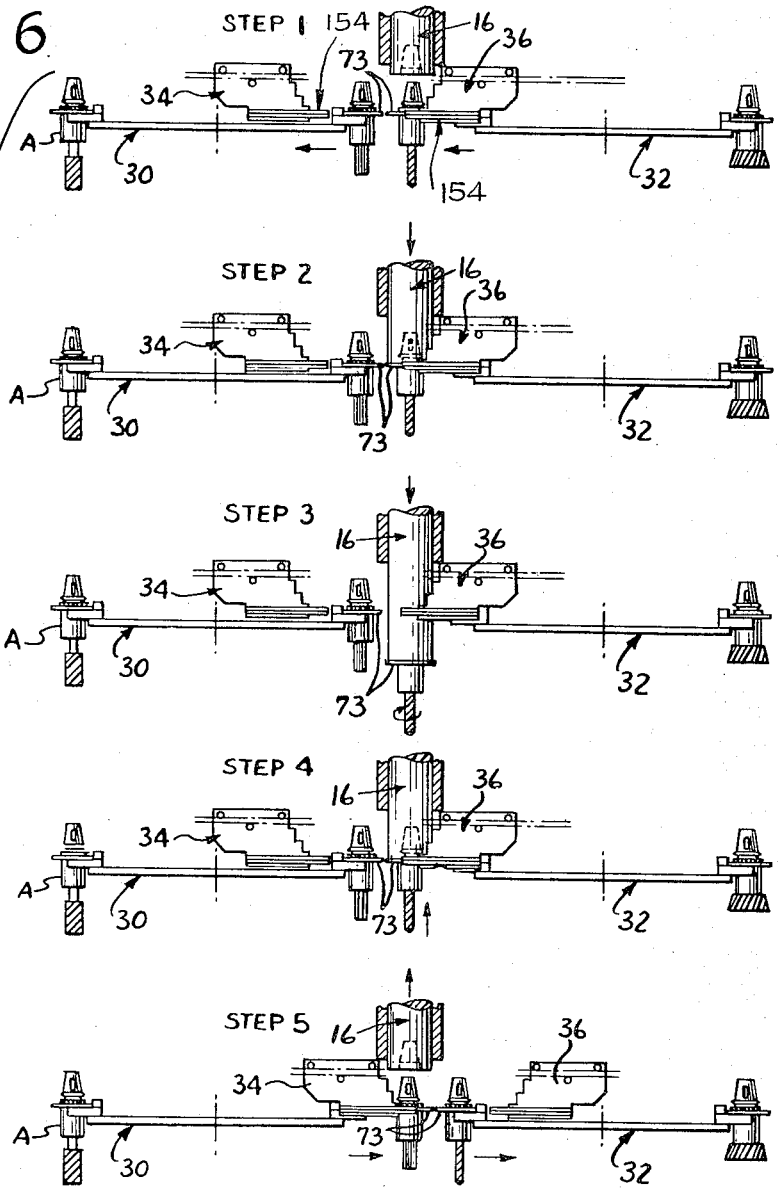

United States Patent Office 3,369,820
Patented Feb. 20, 1968

3,369,820
POWER CHUCK
Robert A. Lehmkuhl, Appleton, and Robert E. Reed, Kaukauna, Wis., assignors to Giddings & Lewis, Inc., a corporation of Wisconsin
Original application Sept. 19, 1962, Ser. No. 224,626. Divided and this application Jan. 28, 1965, Ser. No. 428,642
7 Claims. (Cl. 279—4)

This application is a division of Ser. No. 224,626, filed Sept. 19, 1962, now abandoned in favor of continuation application thereof, Ser. No. 518,505, filed Nov. 22, 1965, now Patent No. 3,332,142.

This invention relates to machine tools and more particularly to machine tools with automatic tool changing apparatus wherein a spindle and a tool assembly are provided with mating means for effecting positive driving engagement therebetween.

The present invention is directed to mechanisms for holding individual tools in the apparatus and its principal object is to provide means for securing or chucking the individual tools in the machine tool spindle.

Another object of the invention is to provide an improved power operated chuck for the machine tool spindle which will accept a tool held stationary by a tool transfer shuttle and will fully seat and secure the tool in the spindle for machining purposes. A related object is to provide a power chuck which will readily release a tool from a longitudinally movable spindle and thereby permit transfer of such tool from the spindle by power driven transfer apparatus.

A further object of the invention is to provide a tool assembly including a tool adapter suitable for use in an automatic tool changing apparatus of the character set forth above.

Other objects will appear from the following description taken in connection with the accompanying drawings, wherein:

FIG. 2 is an enlarged elevational view of one illustrative tool assembly adapted for use in the machine of FIG. 1;

FIG. 3 is an elevational view of the end of the spindle;

FIG. 4 is a fragmentary longitudinal sectional view of the upper end of the spindle and spindle chuck actuator;

FIG. 5 is a fragmentary longitudinal sectional view of the lower end of the spindle illustrating the spindle chuck;

FIG. 6 is a diagrammatic view illustrating the tool change cycle sequence.

Figure 1:
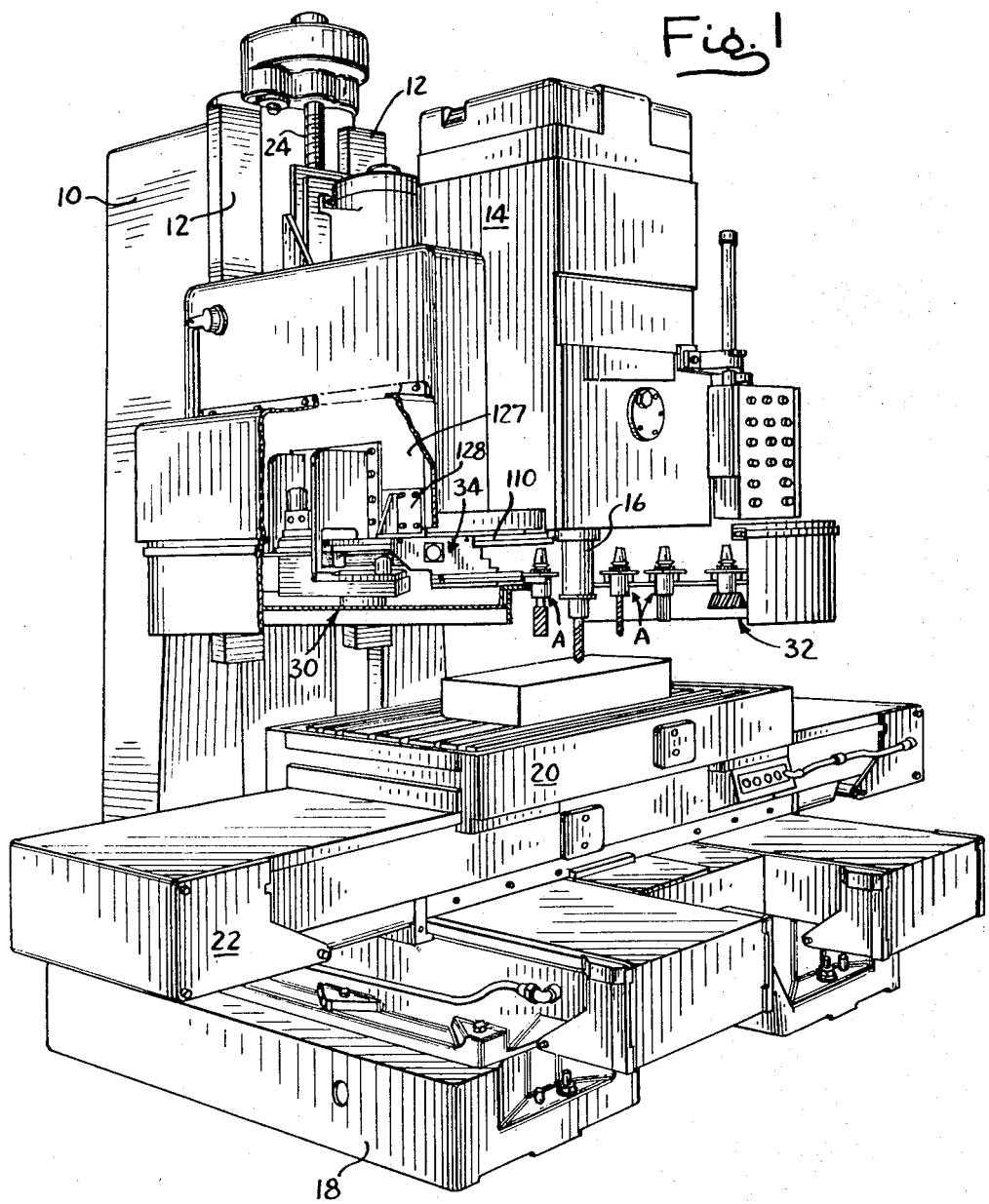
FIGURE 1 is a front perspective view of a drilling machine tool with tool changer apparatus, constructed in accordance with the present invention.

While the invention is susceptible of various modifications and alternative constructions, an illustrative embodiment thereof has been shown in the drawings and will be described below in detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

*General machine organization*

Referring to the drawings, the invention is illustrated in this instance in the environment of an upright drilling machine with tool changer apparatus. As shown more particularly in FIG. 1, the machine tool comprises an upright column 10 fashioned with vertical ways 12 slidably supporting a headstock 14 having a vertically movable spindle 16, and a bed 18 for slidably supporting a table 20 on which a workpiece is adapted to be carried for machining purposes. The work table 20 is slidably supported for horizontal movement on a saddle 22 to move the workpiece and thereby achieve relative motion between a cutting tool in the spindle 16 and workpiece on the table in the conventional Y direction. The saddle 22 is movable longitudinally to move the table 20 and thereby the workpiece and spindle mounted cutting tool relative to each other in the conventional X direction. Table and saddle feed screws for achieving table and saddle feed are preferably power operated through appropriate variable speed drives. Raising and lowering of the headstock 14 of the drilling machine by power along the vertical ways 12 of the column for adjustment purposes may be achieved by a power driven elevating screw 24. The vertically movable spindle 16 is movable by power to provide relative movement between the cutting tool and workpiece in the conventional Z direction by a power feed drive means herein shown in FIG. 5 as including a rack 26. Such table, saddle and spindle feed drive may be numerically controlled from a suitable source of programmed data to provide three axis control of relative workpiece and cutting tool position.

In addition to the foregoing components of a conventional drilling machine tool, the machine tool of the present invention includes storage means for tools which are adapted to be received in the spindle and tool changing means for transferring such tools between the storage means and the spindle. Still referring to FIG. 1, storage of tools is achieved in a unique and particularly advantageous way that contemplates simultaneous transfer of (1) a selected tool to the spindle and (2) return of the tool in the spindle to storage, thereby to achieve a rapid tool change cycle that will involve little or no loss of time in the high-production operating cycle of the machine tool. To this end, tool storage is provided by dual matrixes 30, 32 supported on the opposite sides of the vertically movable headstock 14. Each matrix (30 or 32) is rotatable about a vertical axis spaced a substantial distance to the side of the axis of the spindle 16; it will be noted that each such matrix has an annular ring of individual tool support elements. Power means are provided (not shown) to rotate the annular matrixes 30 or 32 during a search step under manual or automatic control to position the individual tool support elements successively adjacent a tool transfer station, and to stop the matrix with a selected tool at such station whereby the selected tool may be transferred from matrix to spindle.

For transfer of tools between each matrix and the spindle, means are provided in association with each matrix such as a horizontally movable shuttle 34 or 36 (FIG. 6) having means for holding a tool during the transfer operation. With separate matrixes each having a shuttle, it becomes possible to control the tool change cycle so that one shuttle returns the old tool from the spindle to one matrix, while the other shuttle transfers a selected tool from the other matrix to the spindle. A more rapid tool change cycle becomes possible utilizing the same time period for transfer of a new tool to the spindle as for return of the old tool from the spindle to the other matrix. It will be appreciated that this machine tool is adapted for numerically controlled operation, and that the steps of new tool presentation, old tool return and new tool transfer may be programmed steps in such operation as portions in any sequence of the tool change cycle, although the invention is not restricted to such an operating mode and is equally applicable to manually controlled machine tools.

Tool adapter

One of the features of the present invention revolves about the provision of a simple and fool-proof mechanism for gripping each tool while in the matrix and during the transfer operation by a shuttle. This mechanism involves a radially projecting flange 73 on the shank of the tool assembly shown in FIG. 2 as provided by a tool adapter A furnished for each tool. The tool adapter A also provides a tapered shank 74 adapted to be received in the socket of the machine tool spindle 16. The taper of the shank 74 is preferred to be of the standard milling machine or non-sticking type to permit ready insertion and extraction of the adapter in the machine tool spindle. Referring more specifically to FIG. 2 and also to FIG. 5, which illustrates the lower end of the spindle 16, the shank 74 of each adapter A is provided with an annular V-shaped ridge 76 which is adapted to cooperate with radially inwardly movable jaws 78–1 to 78–4 of a power chuck 80 in the spindle 16, the details of which are set forth in a later section. For present purposes, it is sufficient to note that adjacent the open end of the spindle 16 such jaws 78–1 to 78–4 are mounted in radial slots such as 82–1 and 82–4. The inner facing ends of the jaws are formed with V-shaped notches 84 which are adapted to receive the annular V-shaped ridge 76 of a tool carrying adapter A. The ridge 76 provides an annular camming surface 76' facing toward the tool carrying portion of the tool adapter or element, to cooperate with a similarly inclined camming surface 84' on the jaws 78–1 to 78–4. Such jaws are power actuated inwardly to engage the sloping forward camming surface 84' of the notches 84 in the jaws with the mating surface 76' of the ridge 76 so that upon such inward movement of the jaws under power the tool adapter A is forced by the resulting cam action between the mating inclined surfaces to seat the tapered shank 74 in the spindle socket.

Each tool adapter A is also formed with a multiple tooth external clutch 86 immediately behind the flange 73. (FIG. 2). The external teeth of this clutch 86 are spaced to engage with mating internal teeth of a spline 88 (FIGS. 3 and 5) formed on the end of the tool spindle 16 and defining the mouth 16' of the spindle socket to serve as a positive driving connection between the tool adapter A and the spindle. In inserting a tool adapter A into the spindle 16, the external teeth of the clutch 86 on the adapter are engaged with the internal teeth of the spline 88 on the spindle, and the shank 74 of the adapter A is inserted far enough into the spindle 16 to place the ridge 76 on the shank opposite the notches 84 in the chuck jaws 78 whereupon the latter upon being power actuated seat the adapter solidly in the spindle and lock it in place.

Tool transfer shuttles

With either matrix 30, 32 positioned with a new or selected tool at the respective transfer station, a tool transfer means is operable to pick up a tool at such transfer station and move it toward the spindle 16. The present invention provides for this purpose the linearly movable tool shuttles 34, 36. Such shuttles are supported by and movable along a fixed track 110, which at the spindle end of the track is secured to the underside of the headstock and at the other end is secured to the side of an arm 127 by means such as a bracket 128. This bracket 128 affords adjustment of the end of the track 110 so that it may be aligned between the vertical axis of the tool spindle 16 and the axis of the matrix. It is well to keep in mind that while this description is directed toward the left-hand matrix 30, the left-hand shuttle 34, and its track 110, the right-hand matrix 32, shuttle 36 and track therefor are similar and the description applies equally.

In order to hold a tool during the transfer operation of a tool change cycle, each shuttle is provided with means for gripping a tool by means of its adapter A. It will be recalled that the tool adapters A are provided with a projecting flange 73. In keeping with the present invention, the gripping means on the shuttle includes spaced gripping arms 154 which are located to straddle this flange 73 on a tool adapter A and to grip the tool adaptor by means of the flange.

In keeping with the present invention, the gripping means on the shuttle 34 is operable to engage or to release the adapter A of a tool upon relative movement between the shuttle and the adapter in either of two directions: (1) radially of a tool adapter (2) axially of a tool adapter. This is achieved in the present case by forming each arm 154 which extends forwardly from the shuttle of two elements, which extend horizontally and are arranged one on top of the other, and wherein one of such elements is more flexible than the other. The arms 154 formed by these elements while projecting forwardly of the shuttle 34 also have portions which extend along the sides of the shuttle, the outer surfaces of the side of the shuttle side plates having longitudinally outwardly facing recesses to receive such elements.

While both gripping elements forming each arm 154 are flexible, the lower gripping element is made rather slender and more limber so that the set of such opposite elements may be forced apart by power a substantial distance and returned from such position by the inherent flexibility of the elements in order to engage and release the flange 73 on a tool adapter A in cooperation with the companion, relatively more rigid, less flexible upper set of gripping elements.

It will thus be seen that both elements of each gripping arm 154 are spread apart to pick up and release the adapter A of a tool, and for this purpose are flexible. Briefly stated, to start the tool transfer operation the shuttle 34 moves forwardly to pick up a tool in the matrix 30 so as to carry the same forard to the spindle 16 and as an incident to such movement, the upper tool gripper elements will be spread apart sufficiently to slide around the adapter so that the arm will straddle the flange 73 of the tool adapter A with the adapter flange 73 resting on the seat provided by the lower elements. The shuttle 34 is then free to move along the track 110 to transfer the selected tool from the matrix 30 into a position in longitudinal alignment with the spindle 16.

With dual matrixes 30, 32, and separate shuttles 34, 36 for transferring tools to and from the spindle 16 and such matrixes, a wide variety of different sequences may be carried out in a tool change cycle. FIG. 6, however, illustrates a typical cycle which takes advantage of the separate matrixes and shuttles and utilizes such to permit a rapid tool change cycle. In this cycle in steps 1 and 2, the tool is carried to position in axial alignment with the spindle 16, and the spindle 16 is moved downwardly so that the shank of the tool adapter A is received in the spindle socket. At this point in the cycle a power chuck is operated to secure the adapter in the spindle.

Thereupon the lower set of gripping elements 154–1 are spread apart by power means so that the spindle 16 may be moved downwardly to position the tool in cutting engagement with the workpiece.

Spindle power chuck

Now referring to FIGS. 4 and 5, as mentioned above the spindle is equipped with a power chuck that serves to secure the tool adapter A in the spindle. From the diagrammatic illustration in FIG. 6 of the operating cycle of the drilling machine tool, it will be clear that the shuttle 34 carries a selected tool element during the transfer phase of the tool change cycle, to position in axial alignment with the spindle. The spindle is then moved downwardly to receive the tool adapter, and in connection with this operation the power chuck 80 is operated to seat the tool adapter A solidly in the spindle socket and to lock the adaptor in place. Cutting operations are carried out by lowering the spindle 16 to engage the cutting tool with the workpiece, without withdrawing the shuttle, the gripper arms 154 on the shuttle 34 having a clearance with the cylindrical outer surface of the spindle.

To this end, the spindle as shown in FIGS. 4 and 5 is rotatably mounted by bearings 172, 174 within a sleeve 176 which in turn is translatably supported within the headstock 14 for axial projection therefrom. For a more detailed description of means for feeding and for rotating the spindle 16, reference may be made to copending application of Reichert and Lehmkuhl, Serial No. 136,703, filed September 5, 1961, entitled "Radial Drilling Machine and Counterbalance Therefor," now Patent No. 3,151,505, issued October 6, 1964. While the rotatable spindle 16 in said application is shown in connection with a radial drill, the drive and feed means for the spindle is generally applicable to the spindle in the present upright drilling machine tool. In general, translation of the spindle 16 is achieved by means such as a rack and pinion drive, the rack 26 thereof being provided along an upper portion of the sleeve 176. Rotary drive of the spindle 16 within the sleeve 176 is achieved by gear means engaging external gear teeth 180 (FIG. 4) on an upper portion of the spindle.

Still referring to FIGS. 4 and 5 for details of the power chuck 80 for releasably securing a tool adapter A in the tapered socket of the spindle, in the present case, the chuck 80 is powered by compressed air supplied from a suitable source through a fitting 182 mounted at the upper end of the rotatable spindle 16, and a conduit 184 leading downward from the fitting 182 through the center of the spindle to the power chuck 80 at the lower end thereof leads compressed air via such fitting to the power chuck. Passages 186 in the lower end of the spindle connect the conduit 184 to an annular recess 188 which, with a sleeve 190 fitting over the spindle, forms a cylinder housing a chuck actuating piston 202. A drive plate 194 attached by pins 196 to the front end of the spindle and to the sleeve 190 closes the end of the recess 188.

Radial slots 198–1 to 198–4, four of which slots are shown in the drive plate 194, align with radial slots 199–1 to 199–4 in the front end of the spindle 16. Chuck jaws 78–1 to 78–4 are slidably retained in the aligned slots for radial movement. To actuate the jaws 78 and force them inwardly the annular actuating piston 202 carries four forwardly extending projections 202–1 to 202–4 which have inclined cam surfaces 202–1' to 202–4' adapted to engage inclined surfaces on the jaws 78–1 to 78–4 and thereby provide a camming action to force such jaws radially inwardly. The inner ends of the jaws are formed with V-shaped notches 84, as mentioned hereinbefore, adapted to engage the annular V-shaped ridge 76 on the shank of each tool adapter A. Upon being forced inwardly by the actuating piston 202, the jaws 78–1 to 78–4 via the forward inclined surfaces of the V-shaped notches 84 in the ends thereof engage the mating inclined surfaces on the V-shaped ridge 76 of the tool adapter A to move the adapter upwardly in the spindle socket to seat the adapter and lock it therein.

In order to permit a tool adapter A to be inserted into the spindle socket, and to be removed therefrom, means are provided to return the actuating piston 202 and thereby remove any actuating force from the jaws 78. Such return means are herein shown as springs 206 located between the piston and driver plate. The jaws 78 are free to slide so that the latter will be cammed outwardly by direct engagement of a beveled shoulder 84" facing toward the socket mouth 16' with the ridge 76 on a tool adapter A, as for example upon downward movement of the spindle 16 toward an adapter A positioned below the spindle, as diagrammatically depicted in step 2 of FIG. 6. Similarly, upon raising the spindle 16 above an adapter A held therebelow, as in step 5 of FIG. 6, the jaws 78 will be pushed outwardly so as to permit separation of the spindle from the adapter.

*Machine tool operating cycle*

Before turning to an illustration of a specific operating sequence of the machine tool including tool change cycle, it will be understood that a wide variety of different specific sequences may be followed to suit the machining steps involved, the particular tools, or to account for other factors. In general, however, it is to be noted that in accordance with the invention, dual matrixes 30, 32 are provided so that tools may be taken alternately from one and then the other matrix, shortening the overall period of the tool change cycle because different steps thereof may be carried out simultaneously using both shuttles 34, 36.

For example, as shown in FIG. 6 in step 5 both shuttles are being employed for simultaneous transfer of a selected tool from the left-hand matrix 30 to the spindle 16 by one shuttle 34, and return by the other shuttle 36 of the tool used in the previous machining cycle to the right-hand matrix 32. The next subsequent tool change cycle may involve search of the right-hand matrix, during the prior machining step, and transfer of the selected tool from such right-hand matrix to the spindle, shown as step 1 in FIG. 6.

Still referring to FIG. 6, step 1 shows the spindle 16 fully retracted within the headstock 14 and the selected or "new" tool after being carried forward by the right-hand shuttle to the spindle transfer position in axial alignment with the spindle.

To insert the tool adapter A carrying the selected tool into the spindle socket, the spindle is lowered as shown in step 2 of FIG. 6 by actuation of the spindle feed. When the spindle is in position to clamp the tool adapter A, as shown in step 2 of FIG. 6, the power chuck 80 is operated.

It will be appreciated that the construction of the gripper elements of the shuttle eliminates the necessity of operating such gripper elements by power means except for the immediately succeeding step involving release of the tool adapter A for movement of the spindle downward toward the workpiece, shown as step 3 in FIG. 6. The procedures of pick up of a tool adapter at the tool transfer station by the shuttle and dropping off a tool adapter at such station upon return of the shuttle are achieved without power actuation of the gripper elements, but merely by mechanical actuation of such elements through engagement with the tool adapter flange 73 as an incident to linear shuttle movement causing the elements to spring apart around the flange, as shown in FIG. 6.

Accordingly, with the spindle lowered to position the cutting tool in engagement with the workpiece as shown in step 3 of FIG. 6, the spindle drive is started to rotate the spindle to perform the cutting operation.

At the completion of such cutting operation, the spindle is retracted as shown in step 4, FIG. 6. The lower set of gripper elements 154–1 are cammed apart upon engagement by the flange 73 on the tool adapter A with the conical camming surface defined between such lower set of elements, to snap the flange 73 through the bottom set of elements against the upper set of elements and thereby lock the adapter A within the gripping arms.

With the left-hand shuttle 34 fully retracted in steps 1, 2 and 3 of FIG. 6, the left-hand matrix 30 may be shifted to a new tool, according to programmed data and under the direction of a numerical control system. The matrix during such step will be rotated to position the tool support at the programmed location No. 1 to No. 20, in the transfer station as shown in step 4 of FIG. 6, with the selected tool in the particular location ready for transfer by the left-hand shuttle to the spindle. This is shown in step 5 of FIG. 6 which depicts the right-hand shuttle being retracted to return the old tool to the matrix, and the left-hand shuttle at its forwardmost position with the tool carried thereby in axial alignment with the spindle.

We claim as our invention:

1. In a machine tool spindle having a socket with a tapered section, the combination of: a tool adapter including a tapered shank adapted to be received in said socket, a tool carrying portion adjacent the larger end of said shank, an annular radially extending ridge extending peripherally around the larger end of said shank, said ridge presenting an annular camming surface, inclined to the axis of said shank, facing toward said tool carrying portion of said tool adapter, and a continuous ring of external drive teeth on said tool carrying portion of said tool adapter adjacent to said ridge; a continuous ring of internal drive teeth carried by the end of said spindle so as to define the mouth of said socket and adapted to slidably mesh with the external drive teeth on a tool adapter as its shank is moved into the tapered section of said socket; and a power chuck in said spindle comprising a plurality of radially movable jaws mounted adjacent said internal drive teeth and between the latter and said tapered section of said socket, and power means in said spindle engageable with said jaws for camming said jaws radially inwardly, said jaws being otherwise freely movable radially of said spindle, each of said jaws having an arcuate camming surface, inclined to the spindle axis, facing away from the socket mouth and effective upon radially inward movement of said jaws by said power means after the ridge of a tool adapter is positioned past said shoulder to engage a segmental portion of said annular camming surface on said ridge and thereby develop an axial force urging the tapered shank into engagement with the tapered section of said socket and for retaining the tool adapter in the spindle with said drive teeth in mesh, so as to provide a positive drive connection between the spindle and the tool adapter.

2. In a machine tool spindle having a socket with a tapered section, the combination of: a tool adaptor including a tapered shank adapted to be received in said socket, a tool carrying portion adjacent the larger end of said shank, an annular radially extending ridge extending peripherally around the larged end of said shank, said ridge presenting an annular camming surface, inclined to the axis of said shank, facing toward said tool carrying portion of said tool adapter, and a continuous ring of external drive teeth on said tool carrying portion of said tool adapted adjacent to said ridge; a continuous ring of internal drive teeth carried by the end of said spindle so as to define the mouth of said socket and adapted to slidably mesh with the external drive teeth on a tool adapter as its shank is moved into the tapered section of said socket; and a power chuck in said spindle comprising a plurality of radially movable jaws mounted adjacent said internal drive teeth and between the latter and said tapered section of said socket, and means on said spindle including a power member for moving said jaws radially inwardly, said power member being movable from a retracted position to engage said jaws, said jaws being freely movable radially when said power member is retracted, each of said jaws having an arcuate camming surface, inclined to the spindle axis, facing away from the socket mouth and effective upon radially inward movement of said jaws by said power member after the ridge of a tool adapter is positioned past said shoulder to engage a segmental portion of said annular camming surface on said ridge and thereby develop an axial force urging the tapered shank into engagement with the tapered section of said socket and for retaining the tool adapter in the spindle with said drive teeth in mesh, so as to provide a positive drive connection between the spindle and the tool adapter.

3. In a machine tool spindle having a socket with a tapered section, the combination of: a tool adapter including a tapered shank adapted to be received in said socket, a tool carrying portion adjacent the larger end of said shank, an annular radially extending ridge extending peripherally around the larger end of said shank, said ridge presenting an annular camming surface, inclined to the axis of said shank, facing toward said tool carrying portion of said tool adapter, and a continuous ring of external drive teeth on said tool carrying portion of said tool adapter adjacent to said ridge; a continuous ring of internal drive teeth carried by the end of said spindle so as to define the mouth of said socket and adapted to slidably mesh with the external drive teeth on a tool adapter as its shank is moved into the tapered section of said socket; and a power chuck in said spindle comprising a plurality of radially movable jaws mounted adjacent said internal drive teeth and between the latter and said tapered section of said socket, each of said jaws jaws having a shoulder facing toward the socket mouth for engaging the ridge of a tool adapter as the ridge is moved past said shoulder and urging the jaws outwardly, and power means engageable with said jaws for camming said jaws radially inwardly, said jaws being otherwise freely movable radially of said spindle, each of said jaws further having an arcuate camming surface, inclined to the spindle axis, facing away from the socket mouth and effective upon radially inward movement of said jaws by said power means after the ridge of a tool adapter is positioned past said shoulder to engage a segmental portion of said annular camming surface on said ridge and thereby develop an axial force urging the tapered shank into seated engagement with the tapered section of said socket and for retaining the tool adapter in the spindle with said drive teeth in mesh, so as to provide a positive drive connection between the spindle and the tool adapter.

4. In a machine tool spindle having a socket with a tapered section, the combination of: a tool adapter including a tapered shank adapted to be received in said socket, a tool carrying portion adjacent the larger end of said shank, an annular radially extending ridge extending peripherally around the larger end of said shank, said ridge presenting an annular camming surface, inclined to the axis of said shank, facing toward said tool carrying portion of said tool adapter, and a continuous ring of external drive teeth on said tool carrying portion of said tool adapter adjacent to said ridge; a continuous ring of internal drive teeth carried by the end of said spindle so as to define the mouth of said socket and adapted to slidably mesh with the external drive teeth on a tool adapter as its shank is moved into the tapered section of said socket; and a power chuck in said spindle comprising a plurality of radially movable jaws mounted adjacent said internal drive teeth and between the latter and said tapered section of said socket, each of said jaws having a shoulder facing toward the socket mouth for engaging the ridge of a tool adapter as the ridge is moved past said shoulder and urging the jaws outwardly, and power means for moving said jaws radially inwardly, including a sleeve around the end of the spindle concentric with the tapered section of said spindle socket and said jaws, an annular recess in said spindle inside said sleeve and defining an annular cylinder, an annular piston slidably mouted adjacent said sleeve in said cylinder having portions extending axially of the spindle for engagement with said jaws, pressure fluid supply passages in said spindle leading to said recess, said piston projections and said jaws having means cooperating to cam said jaws radially inwardly upon fluid pressure powered axial movement of said piston, said jaws being otherwise freely movable radially of said spindle, each of said jaws further having an arcuate camming surface, inclined to the spindle axis, facing away from the socket mouth and effective upon radially inward movement of said jaws by said power means after the ridge of a tool adapter is positioned past said shoulder to engage a segmental portion of said annular camming surface on said ridge and thereby develop an axial force urging the tapered shank into seated engagement with the tapered section of said socket and for retaining the tool adapter in the spindle with said drive teeth in mesh, so as to provide a positive drive connection between the spindle and the tool adapter.

5. In a machine tool spindle having a socket with a tapered section, the combination of: a tool adapter including a tapered shank adapted to be received in said socket, a tool carrying portion adjacent the larger end of said shank, an annular radially extending ridge extending peripherally around the larger end of said shank, said ridge presenting an annular camming surface, inclined to the axis of said shank, facing toward said tool carrying portion of said tool adapter; and a power chuck in said spindle comprising a plurality of radially movable jaws mounted adjacent the mouth of said socket and between the latter and said tapered section of said socket, each of said jaws having a shoulder facing toward the socket mouth for engaging the ridge of a tool adapter as the ridge is moved past said shoulder and urging the jaws outwardly, and power means for moving said jaws radially inwardly, each of said jaws further having an arcuate camming surface, inclined to the spindle axis, facing away from the socket mouth and effective upon radially inward movement of said jaws by said power means after the ridge of a tool adapter is positioned past said shoulder to engage a segmental portion of said annular camming surface on said ridge and thereby develop an axial force urging the tapered shank into seated engagement with the tapered section of said socket.

6. In a machine tool spindle having a socket with a tapered section, the combination of: a tool adapter including a tapered shank adapted to be received in said socket, a tool carrying portion adjacent the larger end of said shank, an annular radially extending ridge extending peripherally around the larger end of said shank, said ridge presenting an annular camming surface, inclined to the axis of said shank, facing toward said tool carrying portion of said tool adapter; and a power chuck in said spindle comprising a plurality of radially movable jaws mounted adjacent the mouth of said socket and between the latter and said tapered section of said socket, each of said jaws having a shoulder facing toward the socket mouth for engaging the ridge of a tool adapter as the ridge is moved past said shoulder and urging the jaws outwardly, and power means for moving said jaws radially inwardly, including a sleeve around the end of the spindle concentric with the tapered section of said spindles socket and said jaws, an annular recess in said spindle inside said sleeve and defining an annular cylinder, an annular piston slidably mounted adjacent said sleeve in said cylinder having portions extending axially of the spindle for engagement with said jaws, pressure fluid supply passages in said spindle leading to said recess, said piston projections and said jaws having means cooperating to cam said jaws radially inwardly upon fluid pressure powered axial movement of said piston, said jaws being otherwise freely movable radially of said spindle, each of said jaws further having an arcuate camming surface, inclined to the spindle axis, facing away from the socket mouth and effective upon radially inward movement of said jaws by said power means after the ridge of a tool adapter is positioned past said shoulder, to engage a segmental portion of said annular camming surface on said ridge and thereby develop an axial force urging the tapered shank into seated engagement with the tapered section of said socket.

7. In a machine tool spindle having a socket with a tapered section, the combination of: a tool adapter including a tapered shank adapted to be received in said socket, a tool carrying portion adjacent the larger end of said shank, an annular radially extending ridge extending peripherally around the larger end of said shank, said ridge presenting an annular camming surface, inclined to the axis of said shank, facing toward said tool carrying portion of said tool adapter; and a power chuck in said spindle comprising a plurality of radially movable jaws mounted adjacent the mouth of said socket and between the latter and said tapered section of said socket, and power means for moving said jaws radially inwardly, including means in said spindle defining an annular cylinder concentric with the tapered section of said spindle socket, an annular piston in said cylinder having portions extending axially of the spindle into engagement with said jaws respectively, said piston projections and said jaws having means cooperating to cam said jaws radially inwardly upon powered axial movement of said piston, each of said jaws further having an arcuate camming surface, inclined to the spindle axis, facing away from the socket mouth and effective upon radially inward movement of said jaws by said power means after the ridge of a tool adapter is positioned opposite said arcuate camming surface to engage a segmental portion of said annular camming surface on said ridge and thereby develop an axial force urging the tapered shank into seated engagement with the tapered section of said socket.

References Cited

UNITED STATES PATENTS

| | | | |
|---|---|---|---|
| 2,301,981 | 11/1942 | Steffens. | |
| 2,477,773 | 8/1949 | Soussloff | 279—4 |
| 2,485,799 | 10/1949 | Woytych. | |
| 2,982,557 | 5/1961 | Anschutz. | |
| 3,115,348 | 12/1963 | Penland | 279—51 |

ROBERT C. RIORDON, *Primary Examiner*.